United States Patent
Blon et al.

(10) Patent No.: US 9,231,756 B2
(45) Date of Patent: Jan. 5, 2016

(54) CIRCUIT ARRANGEMENT AND METHOD FOR TRANSMITTING SIGNALS

(71) Applicant: SILICON LINE GMBH, Munich (DE)

(72) Inventors: Thomas Blon, Munich (DE); Florian Jansen, Munich (DE); Holger Hoeltke, Munich (DE)

(73) Assignee: SILICON LINE GMBH, Munich (DE)

( * ) Notice: Subject to any disclaimer, the term of this patent is extended or adjusted under 35 U.S.C. 154(b) by 0 days.

(21) Appl. No.: 14/181,465

(22) Filed: Feb. 14, 2014

(65) Prior Publication Data

US 2015/0043692 A1 Feb. 12, 2015

Related U.S. Application Data

(63) Continuation of application No. PCT/DE2012/200054, filed on Aug. 16, 2012.

(30) Foreign Application Priority Data

Aug. 16, 2011 (DE) .................. 10 2011 052 764.8

(51) Int. Cl.
*H04L 7/00* (2006.01)
*H04L 7/04* (2006.01)
*H04L 25/02* (2006.01)
*G06F 1/10* (2006.01)
*G06F 1/04* (2006.01)

(52) U.S. Cl.
CPC ............... *H04L 7/048* (2013.01); *G06F 1/105* (2013.01); *H04L 7/0091* (2013.01); *H04L 25/0276* (2013.01); *G06F 1/04* (2013.01); *H04L 7/0008* (2013.01)

(58) Field of Classification Search
USPC .................. 375/295, 259, 299, 288, 354, 356
See application file for complete search history.

(56) References Cited

U.S. PATENT DOCUMENTS

| | | | |
|---|---|---|---|
| 7,587,537 B1 * | 9/2009 | Burney | 710/71 |
| 2006/0045222 A1 * | 3/2006 | Kim et al. | 375/354 |
| 2010/0316099 A1 * | 12/2010 | Sugita et al. | 375/219 |

OTHER PUBLICATIONS

"SL83014 by Silicon Line GmbH", Mar. 3, 2011, URL:http/www.silicon-line.com/SL83014.htm, XP055057663.
"MIPI Alliance Specification for D-PHY", Sep. 22, 2009, URL:http//www.mipi.org/specifications/physical-layer.
P. Dartnell et al., "Serdes Framer Interface Level 5 (SFI-5): Implementation Agreement for 40Gb/s Interface for Physical Layer Devices (OIF-SFI5-01.01)", Optical Internetworking Forum (OIF). URL:http/www.oiforum.com/public/documents/OIF-SF15-01.0.pdf.
International Search Report; PCT/DE2012/200054; Apr. 18, 2013.

* cited by examiner

*Primary Examiner* — Siu Lee
(74) *Attorney, Agent, or Firm* — Studebaker & Brackett PC

(57) ABSTRACT

On the basis
of single-ended signals based on logic levels, and
of differential, in particular common-mode-based, signals,
a circuit arrangement and a corresponding method are proposed, in which it is possible to further reduce the size of tools, which are associated with said type of circuit arrangement and said type of method.

16 Claims, 3 Drawing Sheets

CIRCUIT ARRANGEMENT AND METHOD FOR TRANSMITTING SIGNALS

CROSS-REFERENCE TO RELATED APPLICATIONS

This application is a continuation of international (WO) patent application No. PCT/DE2012/200054, filed 16 Aug. 2012, which claims the priority of German (DE) patent application No. 10 2011 052 764.8, filed 16 Aug. 2011, the contents of each being hereby incorporated herein by reference.

FIELD OF THE INVENTION

The present invention relates to a circuit arrangement and to a method for transmitting both single-ended logic-level-based data signals and clock signals, and differential, in particular common-mode-based, data signals and clock signals.

BACKGROUND OF THE INVENTION

The bit transmission layer or physical layer (PHY) is the bottom layer in the O[pen]S[ystems]I[nterconnection] layer model, also called OSI reference model and denotes a layer model of the International Standards Organisation (ISO) which in turn serves as a design basis for communication protocols in computer networks.

The physical layer (PHY) is responsible for Combining, F[orward]E[rror]C[orrection], modulation, power control, spreading (C[ode]D[ivision]M[ultiple]A[ccess]) and the like PHY makes logical channels (transport channels for U[niversal]M[obile]T[elecommunications]S[ystem]) available to the security layer (D[ata]L[ink]L[ayer]) above it, in particular to a partial layer called M[edia]A[ccess]C[ontrol] Layer.

In principle D-PHY provides a flexible, low-cost and quick serial interface for communication links between components within a mobile device.

As illustrated in FIG. 3A, in modern mobile phones a data source, for example an application processor, provides image data as D-PHY signals to the M[obile]I[ndustry]P[rocessor]I[nterface]-D[isplay]S[erial]I[nterface] for display on a connected data sink, for example on a connected display. Also, a data sink such as an application processor, can receive, via a MIPI-C[amera]S[erial]I[nterface], image data in D-PHY format from a connected data source, such as from a connected camera.

A DSI or DSI-2 or CSI or CSI-2 or CSI-3 based on the D-PHY protocol comprises up to four differential data lines and a differential clock line, which electrically connect the application processor by means of a copper cable with the display and/or with the camera. The data rate per differential data line is up to 1.5 Gbps (Gigabit per second).

This conventional sending and receiving of the D-PHY-DSI signals or the D-PHY-CSI signals via one to four differential data signals and a differential clock line is illustrated by way of example in the D-PHY interface configuration of FIG. 3B by way of two data channels (=so called data lanes CH0+, CH0− and CH1+, CH1−) and a clock line (=so called clock lane CLK+, CLK−) between the modules of the master side (=data source, for example camera and/or application processor) and the modules of the slave side (=data sink, for example application processor and/or display unit).

In this context, as can be seen in FIG. 3A, up to ten copper lines are required for data transmission for each connected display or for each connected camera (for example four times two data lines and one time two clock lines).

As the resolution of displays and cameras increases the data rates from the application processor to the display/the camera also increase. The high-frequency electrical fields created during data transmission interfere with the sensitive adjacent receivers of high-frequency useful signals, such as, for example, with Bluetooth, G[lobal]P[ositioning]S[ystem], U[niversal]M[obile]T[elecommunications]S[ystem] or Wi-Fi-receivers and thus considerably impair their function.

Comprehensive and thus costly screening measures are required in order to ensure interference-free operation of the above mentioned receivers.

As the number of displays and cameras in modern mobile phones or comparable devices increases the sizes of cable harnesses in such devices can easily rise to up to sixty lines, just for the transmission of image data. Disadvantageously these cable harness sizes prevent further miniaturisation of such devices.

OBJECTS AND SUMMARY OF THE INVENTION

Starting from the above-explained disadvantages and inadequacies as well as taking the outlined prior art into account the object of the present invention is to further develop a circuit arrangement of the above-mentioned type and a method of the above-mentioned type in such a way that further miniaturising of devices, to which such circuit arrangement and such method are assigned, is enabled.

This object is achieved by a circuit arrangement according to the invention with the herein described features and by a method according to the invention with the herein described features. Advantageous embodiments and expedient developments of the present invention are described above and below.

This object is achieved by a circuit arrangement
with at least one transmission arrangement, to which can be applied:
data signals transportable on at least one data line, wherein on each of the data lines both
single-ended logic-level-based data signals, and
differential, in particular common-mode-based, data signals are present, and
clock signals transportable on at least one clock line, wherein on each of the clock lines both
single-ended logic-level-based clock signals, and
differential, in particular common-mode-based, clock signals are present,
and with at least one receiving arrangement, which outputs:
data signals transportable on at least one data line, wherein on each of the data lines both
single-ended logic-level-based data signals, and
differential, in particular common-mode-based, data signals are present, and
clock signals transportable on at least one clock line, wherein on each of the clock lines both
single-ended logic-level-based clock signals, and
differential, in particular common-mode-based, clock signals are present,
wherein the transmission arrangement serialises the single-ended, logic-level-based data and clock signals and the differential data and clock signals to form a common signal stream, and
wherein the receiving arrangement deserialises this common signal stream into the single-ended, logic-level-based data and clock signals and the differential data and clock signals.

This object is further achieved by an embodiment of the circuit arrangement according to the invention, wherein the transmission arrangement is arranged downstream of a data source, in particular at least one camera and/or at least one application processor, the receiving arrangement is arranged upstream of at least one data sink, in particular at least one application processor and or at least one display unit, and the data signals, in particular in the form of D-PHY data signals, and the clock signals, in particular in the form of D-PHY clock signals, can be transmitted between the data source and the data sink based on a protocol, in particular based on the CSI protocol and/or based on the CSI-2 protocol and/or based on the CSI-3 protocol and/or based on DSI protocol and/or based on the DSI-2 protocol.

This object is further achieved by an embodiment of the circuit arrangement according to the invention, wherein the transmission arrangement comprises:

at least one input for the data signals and clock signals, at least one transmission interface logic downstream of the input for picking up the data signals and clock signals, at least one serialiser downstream of the transmission interface logic for generating the common signal stream, at least one clock generator, in particular phase-locked-loop, for example clock multiplier unit, downstream of at least one clock module of the transmission interface logic, upstream of the serialiser and provided for generating at least one reference clock, at least one output driver downstream of the serialiser and at least one output downstream of the output driver for transmitting the common signal stream to the receiving arrangement.

This object is further achieved by an embodiment of the circuit arrangement according to the invention, wherein the serialiser comprises:

at least one framer downstream of the transmission interface logic for generating at least one frame recognisable in the receiving arrangement for the common signal stream as well as at least one multiplexer downstream of the framer for generating the common signal stream.

This object is further achieved by an embodiment of the circuit arrangement according to the invention, wherein both the single-ended, logic-level-based data signals and the differential data signals can be applied to the framer and in that the framer, by means of at least one coder, in particular by means of at least one 5b/6b coder block, embeds the differential data signals in the stream of the single-ended, logic-level-based data signals.

This object is further achieved by an embodiment of the circuit arrangement according to the invention, wherein the output driver is configured as at least one laser driver, by means of which at least one laser, in particular at least one V[ertical]C[avity]S[urface]E[mitting]L[aserdiode], downstream of the output can be driven.

This object is further achieved by an embodiment of the circuit arrangement according to the invention, wherein the receiving arrangement comprises:

at least one input for the common signal stream transmitted by the transmission arrangement, at least one input amplifier for picking up the common signal stream, at least one clock and data recovery unit for recovering the data signals and clock signals from the common signal stream, at least one clock module of at least one receiving interface logic downstream of the clock and data recovery unit, at least one deserialiser downstream of the clock and data recovery unit for re-parallelising the data signals and for assigning the re-parallelised data signals to the receiving interface logic and at least one output downstream of the receiving interface logic for the data signals and clock signals.

This object is further achieved by an embodiment of the circuit arrangement according to the invention, wherein the deserialiser comprises:

at least one demultiplexer downstream of the clock and data recovery unit for re-parallelising the data signals as well as at least one deframer downstream of the demultiplexer for assigning the re-parallelised data signals to the receiving interface logic.

This object is further achieved by an embodiment of the circuit arrangement according to the invention, wherein the deframer separates the differential data signals by means of at least one decoder, in particular by means of at least one 6b/5b decoder block, from the single-ended, logic-level-based data signals and assigns the re-parallelised data signals to the respective data lines.

This object is further achieved by an embodiment of the circuit arrangement according to the invention, wherein the input amplifier is configured as at least one transimpedance amplifier, which has at least one photo diode upstream of the input assigned to it.

This object is further achieved by an embodiment of the circuit arrangement according to the invention, wherein the common signal stream can be transmitted optically, in particular via at least one optical medium, for example via at least one optical waveguide, such as via at least one glass fibre and/or via at least one plastic fibre, between the transmission arrangement and the receiving arrangement.

This object is further achieved by an embodiment of the circuit arrangement according to the invention, wherein the data source comprises at least one, in particular up to four-bit-wide, CSI and/or CSI-2 and/or CSI-3 and/or DSI and/or DSI-2 interface for the outgoing data signals, and/or wherein the data sink comprises at least one, in particular up to four-bit-wide, CSI and/or CSI-2 and/or CSI-3 and/or DSI and/or DSI-2 interface for the incoming data signals.

This object is further achieved by a method, wherein at least one transmission arrangement has applied to it:

data signals transportable on at least one data line, wherein on each of the data lines both single-ended logic-level-based data signals, and differential, in particular common-mode-based, data signals are present, and clock signals transportable on at least one clock line, wherein on each of the clock lines both single-ended logic-level-based clock signals, and differential, in particular common-mode-based, clock signals are present, and wherein at least one receiving arrangement outputs:

data signals transportable on at least one data line, wherein on each of the data lines both single-ended logic-level-based data signals, and differential, in particular common-mode-based, data signals are present, and clock signals transportable on at least one clock line, wherein on each of the clock lines both single-ended logic-level-based clock signals, and differential, in particular common-mode-based, clock signals are present, wherein the transmission arrangement serialises the single-ended, logic-level-based data and clock signals and the differential data and clock signals to form a common signal stream, and wherein the receiving arrangement again deserialises this common signal stream into the single-ended, logic-level-based data and clock signals and the differential data and clock signals.

This object is further achieved by an embodiment of the method according to the invention, wherein the common signal stream between the transmission arrangement and the receiving arrangement is transmitted optically, in particular via at least one optical medium, for example via at least one optical waveguide, such as via at least one glass fibre and/or at least one plastic fibre.

This object is further achieved by a use of the circuit arrangement and/or of the method according to the invention for simultaneous serial and/or bundled, in particular CSI protocol-based and/or CSI-2 protocol-based and/or CSI-3 protocol-based and/or DSI protocol-based and/or DSI-2 protocol-based, transmission of both single-ended logic-level-based data signals and clock signals and differential, in particular common-mode-based, data signals and clock signals, in particular D-PHY data signals and D-PHY clock signals, for example up to 4-bit-wide MIPI-D-PHY data signals and MIPI-D-PHY clock signals, between at least one data source, in particular at least one e.g. high-resolution camera acting e.g. as an image source and/or at least one application processor, and at least one data sink, in particular at least one application processor and/or at least one e.g. high-resolution display unit and/or a display unit acting e.g. as an image sink, for example at least one display or at least one monitor.

According to the invention a transmission arrangement is therefore proposed on the one hand by means of which the single-ended L[ow]P[ower] data corresponding to signals based on logic levels and the differential H[igh]S[peed] data corresponding to in particular common-mode-based signals are serialised to form a common signal stream.

Further to the invention a receiving arrangement is proposed, by means of which this common signal stream is again deserialised in the single-ended, single-ended H[igh]S[peed] data corresponding to signals based on logic levels and in the differential L[ow]P[ower] data corresponding to in particular common-mode-based signals.

To do this, the different signals for the transport between the transmission arrangement and the receiving arrangement via at least one optical medium, in particular via at least one optical waveguide, for example via at least one glass fibre and/or via at least one plastic fibre, may be processed, in particular bundled or serialised on the transmission side to form a common signal stream, and then debundled or deserialised on the receiving side.

In a preferred further development of the invention and taking into consideration the peculiarities of the D-PHY protocol on the side of the transmission arrangement, at least one, in particular up to four differential data lines and at least one, in particular exactly one differential clock line of the D[is-play]S[erial]I[nterface] can be serialised, also in the specification DSI-2, and/or of the C[amera]S[erial]I[nterface], also in the specifications CSI-2 and/or CSI-3, in particular by serialising the differential data lines and the differential clock line of the D[isplay]S[erial]I[nterface] and/or the C[amera]S[erial]I[nterface].

In a preferred further development of the present invention and taking into consideration the peculiarities of the peculiarities of the D-PHY-Protokolls a common signal stream bundled or serialised according to above described transmission arrangement can be received on the side of the receiving arrangement, in order to recover therefrom the at least one, in particular up to four, differential data lines and the at least one, in particular exactly one differential clock line for the DSI, also in the specification DSI-2, and/or for the CSI, also in the specifications CSI-2 and/or CSI-3, in particular by debundling.

As a result, the present invention offers the possibility to optically transmit single-ended, logic-level-based data and clock signals and differential, in particular common-mode-based data and clock signals together, in particular configured as D-PHY signals, for example configured as MIPI-D-PHY signals.

Due to the optical transmission no high-frequency electromagnetic fields are generated, which could interfere with sensitive adjacent receivers, such as Bluetooth-, G[lobal]P[ositioning]S[ystem], U[niversal]M[obile]T[elecommunications]S[ystem] or Wi-Fi receivers. As a result, their function is not impaired either.

Advantageously it is therefore not necessary to apply comprehensive and costly screening measures to the transmission media. The number of transmission channels may be reduced to one optical waveguide per display and/or per camera.

The present invention can be typically applied during simultaneous serial and/or bundled, in particular CSI-protocol-based and/or CSI-2-protocol-based and/or CSI-3-protocol-based and/or DSI-protocol-based and/or DSI-2-protocol-based transmission of both single-ended logic-level-based data signals and clock signals and differential, in particular common-mode-based data signals and clock signals, in particular D-PHY data signals or D-PHY clock signals, for example one-to-four-bit wide MIPI-D-PHY data signals and MIPI-D-PHY clock signals, between at least one data source, in particular at least for example a high-resolution camera and/or a camera acting as an image source and/or at least one application processor, and at least one data sink, in particular at least one application processor and/or at least one high-resolution display unit or a display unit acting for example as an image sink, for example at least one display or at least one monitor.

BRIEF DESCRIPTION OF THE DRAWINGS

As already discussed above, there are various possibilities for embodying and further developing the teaching of the present invention in an advantageous manner. For this purpose, on the one hand reference is made to the explanations above and to the dependent claims, and on the other hand further embodiments, features and advantages of the present invention are explained in greater detail below, inter alia by way of the exemplary embodiments illustrated by FIG. 1A to FIG. 2B.

It is shown in.

Like or similar embodiments, elements or features are provided with identical reference numerals in FIG. 1A to FIG. 3B.

DETAILED DESCRIPTION OF THE INVENTION

Figure 1A:
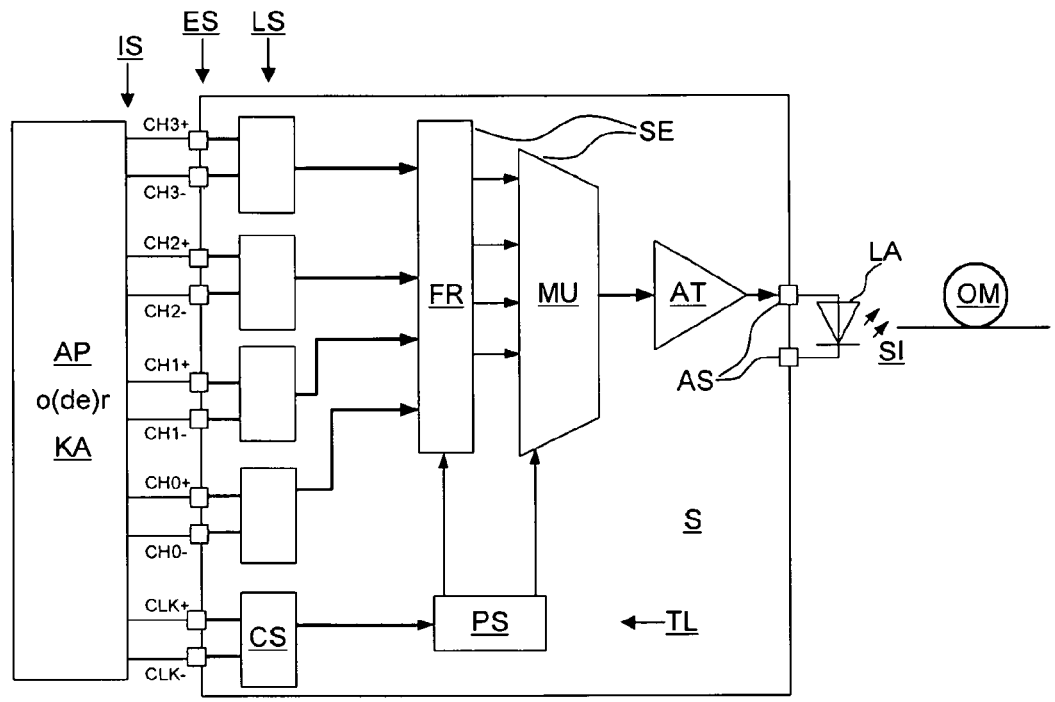
FIG. 1A in a conceptual schematic illustration the first part, i.e. the transmission arrangement of a circuit arrangement configured according to present invention, which operates according to the method of the present invention.
Figure 2A:
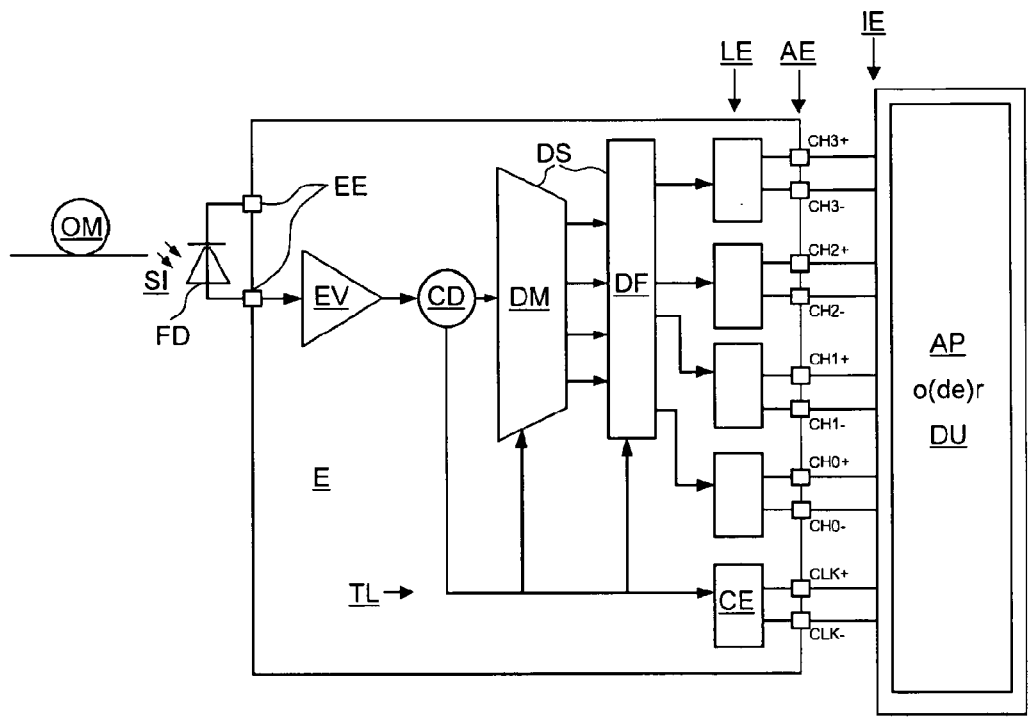
FIG. 2A in a conceptual schematic illustration an embodiment of the second part, i.e. the receiving arrangement of a circuit arrangement configured according to the present invention, which operates according to the method of the present invention.

In principle it is possible,
by means of the embodiment shown in FIG. 1A of a transmission arrangement S according to the present invention and
by means of an embodiment shown in FIG. 2A of a receiving arrangement E according to the present invention,
which results in a circuit arrangement S, E (see FIG. 1A, FIG. 2A) according to the present invention (in terms of the present invention, it is possible, to realise and to operate the transmission arrangement S and the receiving arrangement E independently of each other), to realise and to operate a cable-based link
which has been multiplexed and thus serialised on an optical basis, in particular on the basis of at least one optical medium, for example on the basis of an optical waveguide OM (see detail illustrations in FIG. 1A, FIG. 2A), such as on the basis of at least one glass fibre and/or on the basis of at least one plastic fibre and/or
which has not been multiplexed on an electrical or galvanic basis, in particular on the basis of at least one electrical or galvanic link, for example on the basis of at least one copper cable and/or on the basis of at least one electrical line such as arranged on at least a printed circuit board.

FIG. 1A shows an embodiment of the principal construction of a transmission arrangement S for connection to a D[isplay]S[erial]I[nterface] data transmission interface IS or a C[amera]S[erial]I[nterface]-data transmission interface IS.

The image data generated in the application processor AP or in the camera KA are made available on four data lines or channels CH0+, CH0−, CH1+, CH1−, CH2+, CH2−, CH3+, CH3− as D-PHY signals at the up-to-four-bit-wide data transmission interface IS together with the D-PHY correct clock signals CLK+, CLK−.

The transmission arrangement S picks these signals up at an integrated Interface Logic LS, the blocks of which can prove that they have at least one state machine for correct interpretation of the D-PHY signals and for differentiating between high-frequency data streams (so-called H[igh]S[peed] data) and low-frequency data streams (so-called L[ow]S[peed] data).

A framer FR following in the transmission arrangement S (see also detail view in FIG. 1B) ensures D[irect]C[urrent] balancing of the input signal and generates a frame recognisable on the receiving side (see FIG. 2A), which allows the receiving arrangement E (see FIG. 2A) to re-assign the received data to the correct output data lines or output channels CH0+, CH0−, CH1+, CH1−, CH2+, CH2−, CH3+, CH3−.

Figure 1B:
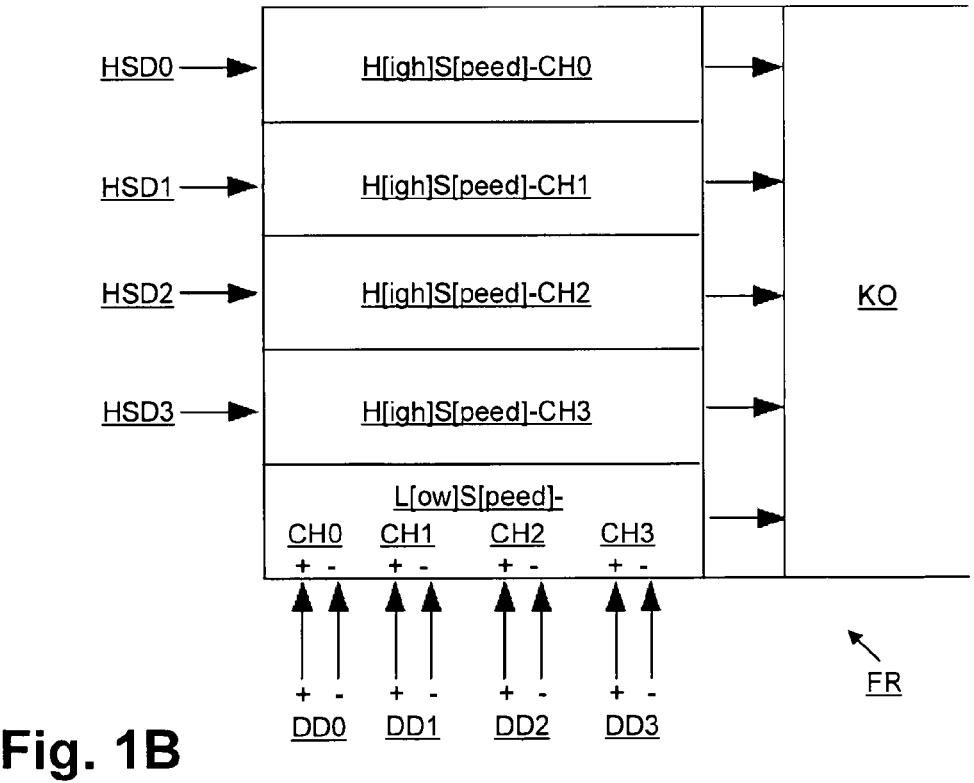
FIG. 1B in a conceptual schematic illustration a detail view of an embodiment of the framer of the transmission arrangement in FIG. 1A.

In detail both the logic-level-based single-ended data signals HSD0, HSD1, HSD2, HSD3 and the differential data signals DD0+, DD0−, DD1+, DD1−, DD2+, DD2−, DD3+, DD3− can be applied to the framer FR according to FIG. 1B. By means of its coder KO configured as a 5b/6b coding block the framer according to FIG. 1B embeds these differential data signals DD0+, DD0−, DD1+, DD1−, DD2+, DD2−, DD3+, DD3− into the stream of the single-ended logic-level-based data signals HSD0, HSD1, HSD2, HSD3.

A multiplexer MU, in particular H[igh]S[peed] Mux, adjoining the frame FR, uses a clock generator PS configured as a phase-locked-loop, in particular as a C[lock]M[ultiplier] U[nit], to generate the high-frequency serial or bundled transmission signal, which is made available at the output AS of the transmission arrangement S by means of an output driver AT. The framer FR and the multiplexer MU together form the serialiser SE.

The D-PHY clock signal provided via the clock port CLK+, CLK− and via the clock module CS of the interface logic LS by means of clock generator PS is used as (clock) reference for the serialiser SE, in particular for its multiplexer MU, and is embedded into the serial data stream, i.e. into the serialised output signal. This creates the common signal stream SI which is communicated to the receiving arrangement E (see FIG. 2A).

As can further be seen in FIG. 1A, the output driver AT is implemented as an integrated laser driver for driving at least one directly connected laser LA, in particular for driving at least one V[ertical]C[avity]S[urface]E[mitting]L[aserdiode].

FIG. 2A shows an embodiment for the principal construction of a receiving arrangement E for connection to a D[isplay]S[erial]I[nterface] data transmission interface IE or also a C[amera]S[erial]I[nterface] data transmission interface IE.

The serial or bundled data sent out by the transmission arrangement S (see FIG. 1A) is picked up via an input amplifier EV of the receiving arrangement E and supplied to an integrated clock or data recovery CD.

This integrated clock or data recovery CD regenerates the original D-PHY clock from the common signal stream SI, which is then made directly available again to the D[isplay]S[erial]I[nterface] or the C[amera]S[erial]I[nterface] via the clock module CE of the interface logic LE. The remaining serial data stream is debundled and parallelised via a demultiplexer DM and handed over to a deframer DF (see also detail in FIG. 2B), which in principle is the mirror image of framer FR according to FIG. 1B. The demultiplexer DM and deframer DF together form the deserialiser DS.

Figure 2B:
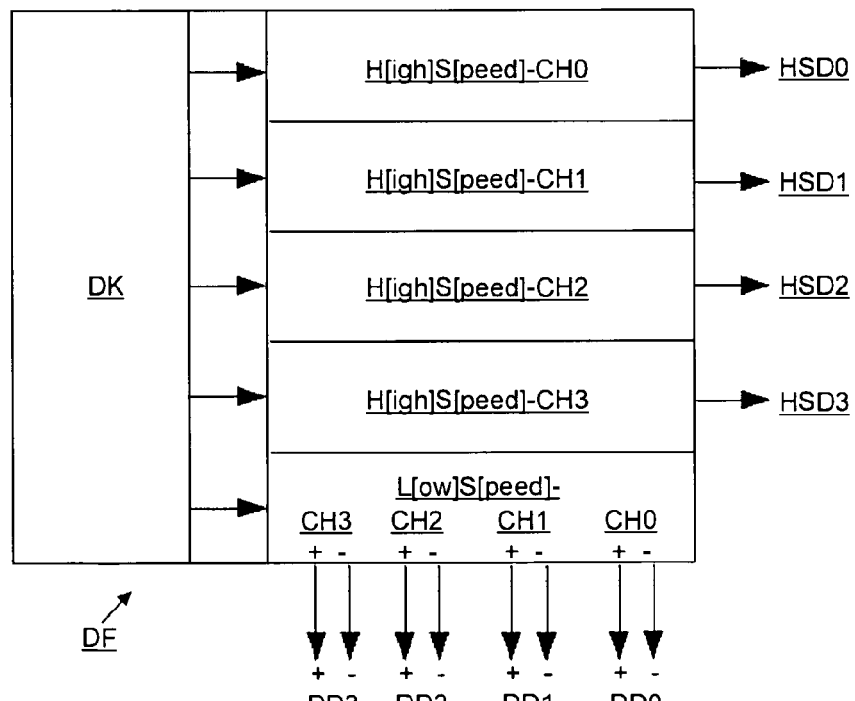
FIG. 2B in a conceptual schematic illustration a detail view of an embodiment of the deframer of the receiving arrangement of FIG. 2A.
Figure 3A:
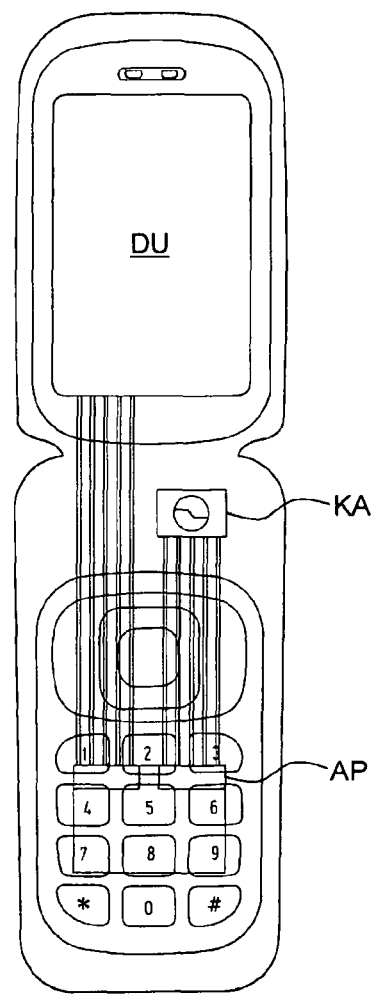
FIG. 3A in a conceptual schematic illustration a typical arrangement from the prior art.
Figure 3B:
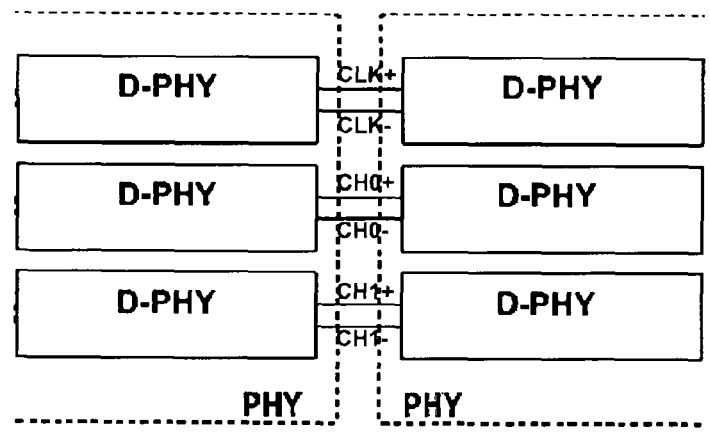
FIG. 3B in a conceptual schematic illustration an example of an interface configuration on which the arrangement in FIG. 3A is based, with two data channels and one clock line.

In detail the deframer FR of FIG. 2B, by means of its decoder DK configured as a 6b/5b decoder block, can separate the differential data signals DD0+, DD0−, DD1+, DD1−, DD2+, DD2−, DD3+, DD3− from the single-ended, logic-level-based data signals HSD0, HSD1, HSD2, HSD3 and re-assign the re-parallelised data signals to the respectively applicable data lines CH0+, CH0−, CH1+, CH1−, CH2+, CH2−, CH3+, CH3−.

The interface logic blocks LE shown in the receiving arrangement E may comprise at least one state machine respectively for correct interpretation of the D-PHY logic signals and for differentiating between high-frequency data streams and low-frequency data streams.

As can also be seen in the illustration in FIG. 2A, the input amplifier EV is implemented as an integrated transimpedance amplifier, which allows a photo diode FD to be directly connected to the receiving arrangement E.

In this way, with regard to the circuit arrangement A (see FIG. 1A, FIG. 2A), it is possible according to the invention to realise and to operate the cable-based multiplexed link between the transmission arrangement S (see FIG. 1A) and the receiving arrangement E (see FIG. 2A) on an optical basis, i.e. by means of an optical waveguide OM configured e.g. in form of a glass fibre and/or in form of a plastic fibre.

LIST OF REFERENCE NUMERALS

E receiving arrangement
S transmission arrangement
AE output of the receiving arrangement E
AP application processor
AS output of the transmission arrangement S
AT output driver, in particular laser driver
CD clock and data recovery unit
CE clock module of the receiving interface logic LE
CH0± first data line or first channel
CH1± second data line or second channel
CH2± third data line or third channel
CH3± fourth data line or fourth channel
CLK± clock line or clock channel
CS clock module of the transmitting interface logic LS
DD0± differential signal, in particular common-mode-based data signal on the first data line or the first channel CH0±
DD1± differential signal, in particular common-mode-based data signal on the second data line or the second channel CH1±
DD2± differential signal, in particular common-mode-based data signal on the third data line or the third channel CH2±
DD3± differential signal, in particular common-mode-based data signal on the fourth data line or the fourth channel CH3±
DF deframer
DK decoder, in particular 6b/5b-Decoderblock, of deframer DF
DM demultiplexer
DS deserialisation element or deserialiser
DU display unit
EE input of the receiving arrangement E
ES input of the transmission arrangement S
EV input amplifier, in particular transimpedance amplifier
FD photo diode
FR framer
HSD0 single-ended logic-level-based data signal on the first data line or the first channel CH0±
HSD1 single-ended logic-level-based data signal on the second data line or the second channel CH1±
HSD2 single-ended logic-level-based data signal on the third data line or the third channel CH2±
HSD3 single-ended logic-level-based data signal on the fourth data line or the fourth channel CH3±
IE data-sink-related CSI and/or CSI-2 and/or CSI-3 and/or DSI and/or DSI-2 interface
IS data-source-related CSI and/or CSI-2 and/or CSI-3 and/or DSI and/or DSI-2 interface
KA camera
KO coder, in particular 5b/6 coder block of framer FR
LA laser
LE receiving interface logic
LS transmitting interface logic
MU multiplexer
OM optical medium, in particular optical waveguide, e.g. glass fibre and/or plastic fibre
PS clock generator, in particular phase-locked-loop, for example clock multiplier unit
SE serialisation element or serialiser
SI common signal stream
TL clock line While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A circuit arrangement
with at least one transmission arrangement, to which can be applied:
  data signals transportable on at least one data line, wherein on each of the data lines both
    single-ended logic-level-based data signals, and
    differential data signals are present, and
  clock signals transportable on at least one clock line, wherein on each of the clock lines both
    single-ended logic-level-based clock signals, and
    differential clock signals are present,
and with at least one receiving arrangement, which outputs:
  the data signals transportable on the at least one data line, wherein on each of the data lines both
    the single-ended logic-level-based data signals, and
    the differential data signals are present, and
  the clock signals transportable on the at least one clock line, wherein on each of the clock lines both
    the single-ended logic-level-based clock signals, and
    the differential clock signals are present,
wherein the transmission arrangement serializes the single-ended, logic-level-based data and clock signals and the differential data and clock signals to form a common signal stream, and
wherein the receiving arrangement deserializes this common signal stream into the single-ended, logic-level-based data and clock signals and the differential data and clock signals.

2. The circuit arrangement according to claim 1,
wherein the transmission arrangement is arranged downstream of a data source,
wherein the receiving arrangement is arranged upstream of at least one data sink, and
wherein the data signals and the clock signals can be transmitted between the data source and the data sink based on a protocol.

3. The circuit arrangement according to claim 1, wherein the transmission arrangement comprises:
  at least one input for the data signals and clock signals,
  at least one transmission interface logic downstream of the input for picking up the data signals and clock signals,
  at least one serializer downstream of the transmission interface logic for generating the common signal stream,
  at least one clock generator downstream of at least one clock module of the transmission interface logic, upstream of the serializer and provided for generating at least one reference clock,
  at least one output driver downstream of the serializer and
  at least one output downstream of the output driver for transmitting the common signal stream to the receiving arrangement.

4. The circuit arrangement according to claim 3, wherein the serializer comprises:
  at least one framer downstream of the transmission interface logic for generating at least one frame recognizable in the receiving arrangement for the common signal stream as well as at least one multiplexer downstream of the framer for generating the common signal stream.

5. The circuit arrangement according to claim 4, wherein both the single-ended, logic-level-based data signals and the differential data signals can be applied to the framer and in that the framer, by means of at least one coder, embeds the differential data signals in the stream of the single-ended, logic-level-based data signals.

6. The circuit arrangement according to claim 3, wherein the output driver is configured as at least one laser driver, by means of which at least one laser downstream of the output can be driven.

7. The circuit arrangement according to claim 1, wherein the receiving arrangement comprises:
   at least one input for the common signal stream transmitted by the transmission arrangement,
   at least one input amplifier for picking up the common signal stream,
   at least one clock and data recovery unit for recovering the data signals and clock signals from the common signal stream,
   at least one clock module of at least one receiving interface logic downstream of the clock and data recovery unit,
   at least one deserializer downstream of the clock and data recovery unit for re-parallelizing the data signals and for assigning the re-parallelized data signals to the receiving interface logic and
   at least one output downstream of the receiving interface logic for the data signals and clock signals.

8. The circuit arrangement according to claim 7, wherein the deserializer comprises:
   at least one demultiplexer downstream of the clock and data recovery unit for re-parallelizing the data signals as well as
   at least one deframer downstream of the demultiplexer for assigning the re-parallelized data signals to the receiving interface logic.

9. The circuit arrangement according to claim 8, wherein the deframer separates the differential data signals by means of at least one decoder from the single-ended, logic-level-based data signals and assigns the re-parallelized data signals to the respective data lines.

10. The circuit arrangement according to claim 7, wherein the input amplifier is configured as at least one transimpedance amplifier, which has at least one photo diode upstream of the input assigned to it.

11. The circuit arrangement according to claim 6, wherein the common signal stream can be transmitted optically between the transmission arrangement and the receiving arrangement.

12. The circuit arrangement according to claim 10, wherein the common signal stream can be transmitted optically between the transmission arrangement and the receiving arrangement.

13. The circuit arrangement according to claim 1, wherein the data source comprises at least one CSI and/or CSI-2 and/or CSI-3 and/or DSI and/or DSI-2 interface for the outgoing data signals.

14. The circuit arrangement according to claim 1, wherein the data sink comprises at least one CSI and/or CSI-2 and/or CSI-3 and/or DSI and/or DSI-2 interface for the incoming data signals.

15. A method,
   wherein at least one transmission arrangement has applied to it:
      data signals transportable on at least one data line, wherein on each of the data lines both
         single-ended logic-level-based data signals, and
         differential data signals are present, and
      clock signals transportable on at least one clock line, wherein on each of the clock lines both
         single-ended logic-level-based clock signals, and
         differential clock signals are present,
   and wherein at least one receiving arrangement outputs:
      the data signals transportable on the at least one data line, wherein on each of the data lines both
         the single-ended logic-level-based data signals, and
         the differential data signals are present, and
      the clock signals transportable on the at least one clock line, wherein on each of the clock lines both
         the single-ended logic-level-based clock signals, and
         the differential clock signals are present,
   wherein the transmission arrangement serializes the single-ended, logic-level-based data and clock signals and the differential data and clock signals to form a common signal stream, and
   wherein the receiving arrangement again deserializes this common signal stream into the single-ended, logic-level-based data and clock signals and the differential data and clock signals.

16. The method according to claim 15, wherein the common signal stream between the transmission arrangement and the receiving arrangement is transmitted optically.

* * * * *